(12) United States Patent
Zhao (10) Patent No.: US 9,491,479 B2
(45) Date of Patent: Nov. 8, 2016

(54) IMAGE COMPRESSION METHOD, APPARATUS AND DEVICE

(75) Inventor: Rui Zhao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 73 days.

(21) Appl. No.: 14/388,930

(22) PCT Filed: Aug. 9, 2012

(86) PCT No.: PCT/CN2012/079871
§ 371 (c)(1),
(2), (4) Date: Feb. 16, 2015

(87) PCT Pub. No.: WO2013/143250
PCT Pub. Date: Oct. 3, 2013

(65) Prior Publication Data
US 2015/0163504 A1    Jun. 11, 2015

(30) Foreign Application Priority Data

Mar. 31, 2012    (CN) .......................... 2012 1 0093330

(51) Int. Cl.
| | |
|---|---|
| *G06K 9/36* | (2006.01) |
| *H04N 19/463* | (2014.01) |
| *H04N 19/172* | (2014.01) |
| *H04N 19/115* | (2014.01) |
| *H04N 19/146* | (2014.01) |
| *H04N 19/102* | (2014.01) |

(52) U.S. Cl.
CPC .......... *H04N 19/463* (2014.11); *H04N 19/102* (2014.11); *H04N 19/115* (2014.11); *H04N 19/146* (2014.11); *H04N 19/172* (2014.11)

(58) Field of Classification Search
CPC .. H04N 9/8047; H04N 19/10; H04N 19/115; H04N 19/12; H04N 19/124; H04N 19/126; H04N 19/13; H04N 19/146; H04N 19/147; H04N 19/149; H04N 19/15; H04N 19/152; H04N 19/17; H04N 19/172; H04N 19/176; H04N 19/192; H04N 19/196; H04N 19/197; H04N 19/44; H04N 19/46; H04N 19/503; H04N 19/593; H04N 19/60; H04N 19/61; H04N 19/63; H04N 19/647; H04N 19/90; G06F 17/30247; H03M 7/30

See application file for complete search history.

(56) References Cited

U.S. PATENT DOCUMENTS

| | | | |
|---|---|---|---|
| 6,614,942 B1 * | 9/2003 | Meier .................. | H04N 19/176 375/E7.13 |
| 7,088,276 B1 * | 8/2006 | Wegener .............. | G06F 17/141 341/144 |
| 7,627,181 B2 * | 12/2009 | Tamura ................ | H04N 19/176 382/232 |

(Continued)

FOREIGN PATENT DOCUMENTS

| | | |
|---|---|---|
| CN | 1498497 | 5/2004 |
| CN | 101119488 | 2/2008 |
| CN | 101155300 | 2/2008 |

*Primary Examiner* — Jose Couso
(74) *Attorney, Agent, or Firm* — Marcus C. Dawes; Daniel L. Dawes (57) ABSTRACT

The present invention provides a method, apparatus and device for image compression. The present invention comprises: determining maximum image reduction information of multiple to be compressed images after compression, based on predetermined compression lower-limit information of the multiple to be compressed images and image size information of each to be compressed image; determining compression parameter information of the multiple to be compressed images based on the maximum image reduction information; determining compression ratio information of each to be compressed image, respectively, based on the compression parameter information, and the image size information and maximum image reduction information after compression of each to be compressed image; compressing each to be compressed image based on the compression ratio information; adding the compressed, multiple to be compressed images into a message to be transmitted for transmission. Compared with the prior art, the present invention has an advantage of ameliorating degradation of image quality caused by over compression of images.

16 Claims, 4 Drawing Sheets

(56) References Cited

U.S. PATENT DOCUMENTS

| | | | |
|---|---|---|---|
| 8,452,110 B2* | 5/2013 | Carmel | H04N 19/176 382/232 |
| 9,111,204 B2* | 8/2015 | Fujita | G06K 15/188 |
| 2010/0103285 A1 | 4/2010 | Kuo | |
| 2012/0057802 A1* | 3/2012 | Yuki | H04N 19/46 382/243 |

* cited by examiner

IMAGE COMPRESSION METHOD, APPARATUS AND DEVICE

FIELD OF THE INVENTION

The present invention relates to the field of image processing, and more specifically, to a method, apparatus, and device for image compression.

BACKGROUND OF THE INVENTION

In the prior art, when it is needed to compress a plurality of images and then add them into a message to be transmitted for transmission, there is no limitation on the compression processing of the images, such that the images are prone to be over-compressed, which deteriorates the compressed image quality.

SUMMARY OF THE INVENTION

An objective of the present invention is to provide a method, apparatus and device for image compression.

According to one aspect of the present invention, there is provided a method for image compression in a user equipment, wherein the method comprises the following steps:

a. determining maximum image reduction information after compression of a plurality of images to be compressed, based on predetermined compression lower-limit information of the images to be compressed and image size information of each of the images to be compressed;

b. determining compression parameter information of the plurality of images to be compressed based on the maximum image reduction information;

c. determining compression ratio information of each of the plurality of images to be compressed based on the compression parameter information, the image size information and maximum image reduction information after compression of each of the plurality of images to be compressed;

d. compressing each of the plurality of images to be compressed based on the compression ratio information;

e. adding the compressed images into a message to be transmitted for transmission.

According to another aspect of the present invention, there is further provided a compressing apparatus for image compression in a user equipment, wherein the compressing apparatus comprises:

a reduction determining module configured to determine maximum image reduction information after compression of a plurality of images to be compressed, based on predetermined compression lower-limit information of the images to be compressed and image size information of each of the images to be compressed;

a compression parameter determining module configured to compression parameter information of the plurality of images to be compressed based on the maximum image reduction information;

a compression ratio determining module configured to compression ratio information of each of the plurality of images to be compressed based on the compression parameter information, the image size information and maximum image reduction information after compression of each of the plurality of images to be compressed;

a compression processing module configured to compress each of the plurality of images to be compressed based on the compression ratio information;

a transmitting module configured to add the compressed images into a message to be transmitted for transmission.

Compared with the prior art, the present invention has the following advantages: 1) the present invention reduces occurrence of image quality degradation caused by over-compression of the images by determining a compression ratio for the image with reference to the predetermined compression lower-limit information; 2) the present invention can determine the image compression parameter based on the image maximum reduction of the image after compression, and then determine the image compression ratio, so that a better compression ratio can be determined while greatly simplifying calculation of the image compression ratio; 3) by performing pre-compression processing to an image with too large resolution, the present invention reduces the issue of unreasonable image compression caused by too large image difference; 4) the present invention can pre-estimate the remaining image capacity information in the message to be transmitted, thereby indicating the image capacity or amount that can be continued to be inserted for the user; 5) in the case of meeting the predetermined compression lower-limit, when the size of the image that is continued to be inserted by the user after compression is to exceed the remaining image capacity information, the present invention can stop the user from continuing insertion of the image, thereby guaranteeing the compression quality of the image.

BRIEF DESCRIPTION OF THE ACCOMPANYING DRAWINGS

Other features, objectives and advantages of the present invention will become more apparent through reading the following detailed description of the non-limiting embodiments with reference to the accompanying drawings below.

Identical or similar reference numerals in the accompanying drawings represent the same or like components.

DETAILED DESCRIPTION OF THE PREFERRED EMBODIMENTS

Hereinafter, the present invention will be described in further detail with reference to the accompanying drawings.

Figure 1:
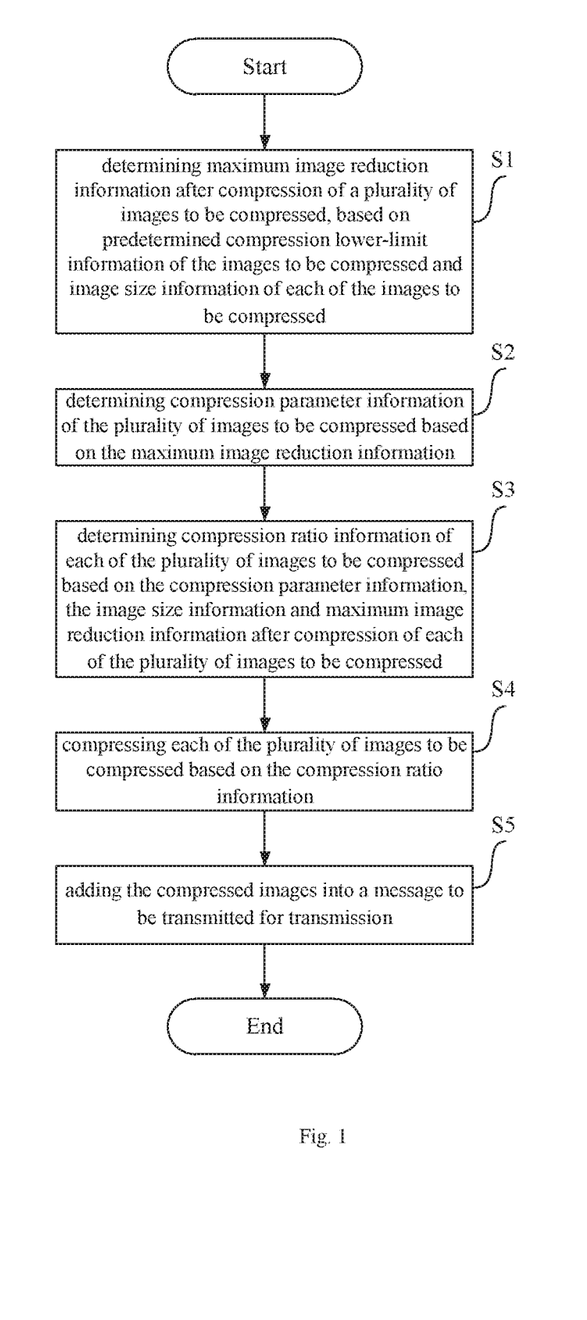
FIG. 1 shows a flow diagram of a method for image compression according to one aspect of the present invention.

FIG. 1 shows a flow diagram of a method for image compression according to one aspect of the present invention. The method according to the present invention comprises step S1, step S2, step S3, step S4, and step S5. The method of the present invention is mainly implemented through user equipment. Preferably, the user equipment includes, but not limited to, a PC, a smart phone, a PDA, an IPTV, a printer, etc. The network where the user equipment is located includes, but not limited to, an Internet, a WIDE AREA NETWORK WAN, a Metropolitan Area Network, a Local Area Network, a VPN network, etc.

It should be noted that the user equipment and the network are only examples. Other existing or future possibly emerging user equipment or network, if applicable to the present invention, should also be included within the protection scope of the present invention, and is incorporated here by reference.

In step S1, the user equipment determines maximum image reduction information after compression of a plurality of images to be compressed, based on predetermined compression lower-limit information of the images to be compressed and image size information of each of the images to be compressed. Wherein, "a/the plurality of" in the present application indicates "two" or "more than "two".

Herein, the plurality of to be compressed images may be determined through a plurality of manners. For example, a smart phone determines, based on a user's image insertion operation performed to an MMS (multimedia message), the plurality of images that need to add into the MMS after compression, as the images to be compressed; for another example, when a user-preset image send time arrives, the instant messaging tool installed in the PC defines a plurality of images in a specified folder to images to be compressed, which need to be compressed and then added into a message for transmission.

Herein, the predetermined compression lower-limit information includes any lower-limit that can be used to define the compression lower-limit of an image. Preferably, the predetermined compression lower-limit information includes, but not limited to, at least one of the following:

1) image size lower-limit information of a compressed image

For example, the image size lower-limit of the image to be compressed after compression is 20 k, etc.

2) compression ratio lower-limit information of the image to be compressed

For example, the compression ratio lower-limit of the image to be compressed is 60%, etc.

Specifically, the user equipment can determine maximum image reduction information after compression of a plurality of images to be compressed, based on predetermined compression lower-limit information of the images to be compressed and image size information of each of the images to be compressed, through a plurality of manners. Preferably, the manner in which the user equipment determines the maximum image reduction information after compression of a plurality of images to be compressed includes, but not limited to:

1) based on image size information of each image to be compressed and predetermined compression lower-limit information, the user equipment determines the smallest image size information to which each image to be compressed can be compressed, thereby determining the maximum image reduction information of each image after compression, then sums the maximum image reduction information of respective images to be compressed after compression as the maximum image reduction information after compression of the plurality of images to be compressed.

For example, the determined a plurality of images to be compressed and their image size information are specified in Table 1 below:

TABLE 1

| Images to be compressed | Image size information |
| --- | --- |
| A | 100k |
| B | 60k |

TABLE 1-continued

| Images to be compressed | Image size information |
| --- | --- |
| C | 80k |
| D | 30k |

The predetermined compression lower-limit information includes: the image size lower-limit after compression of the image to be compressed is 20 k and the compression ratio lower-limit of the image to be compressed is 60%; then, the user equipment determines, based on the image size information of the image A to be compressed 100 k*60%=60 k>20 k, that the maximum image reduction information of the image A to be compressed is (100−60)k=40 k; similarly, the user equipment determines that the maximum image reduction information after compression of images B, C, and D to be compressed is 24 k, 32 k, and 10 k, respectively; then, the user equipment obtains the maximum image reduction information after compression of the plurality of images A to be compressed to D=(40+24+32+10)k=106 k.

2) based on the sum of image size information of the plurality of images to be compressed and predetermined compression lower-limit information, the user equipment determines the maximum image reduction information after compression of a plurality of images to be compressed.

For example, image size information of a plurality of images A to D to be compressed is shown in Table 1; the predetermined compression lower-limit information includes that the compression ratio lower-limit of the images to be compressed is 60%; then the user equipment determines that the maximum image reduction information after compression of the plurality of images A to D to be compressed=(100+60+80+30)k*40%=108 k.

It should be noted that the above examples are only for better understanding the technical solution of the present invention, rather than limiting the present invention. Those skilled in the art should understand, any implementation manner of determining maximum image reduction information after compression of a plurality of images to be compressed, based on predetermined compression lower-limit information of the images to be compressed and image size information of each of the images to be compressed therein, should be included within the protection scope of the present invention, for example, in order to reduce calculation error and the impact on the final result due to inaccurate image size information, the calculated reduction information 106 k and 108 k was deducted by 5 k, as the finally determined maximum image reduction information after compression of the plurality of images A to D to be compressed.

Next, in step S2, the user equipment determines compression parameter information of the plurality of images to be compressed based on the maximum image reduction information.

Specifically, the manner in which the user equipment determines the compression parameter information of a plurality of images to be compressed based on the maximum image reduction information includes, but not limited to:

1) the user equipment directly determine the compression parameter information of a plurality of images to be compressed based on the maximum image reduction information.

For example, given that when the maximum image reduction information belongs to 0-100 k, its compression parameter information is 90%; when the maximum image reduction information is greater than 100 k but no greater than 200 k, its compression parameter information is 80%, and when the maximum image reduction information is greater than 200 k, its compression parameter information is 70%. In step S1, the maximum image reduction information of the plurality of images A to D to be compressed as determined by the user equipment is 116 k, then the user equipment determines that the compression parameter information of the plurality of compression images A to D is 80% based on 116 k being greater than 100 k but no greater than 200 k.

2) Before the present step, the user equipment also performs step S6 to obtain image capacity information, which can be allocated to the compressed plurality of images, in the message to be transmitted; then in the present step, the user equipment determines the compression parameter information of the plurality of images to be compressed based on the maximum image reduction information and image capacity information, wherein the plurality of images to be compressed need to be compressed before being added into the message to be transmitted for transmission.

Herein, the manner in which the user equipment obtains the image capacity information in step S6 includes, but not limited to:

a) the user equipment directly obtains image capacity information, which is pre-allocated to the compressed images, in the message to be transmitted.

For example, suppose the image capacity information, which is pre-allocated to the compressed, a plurality of images to be compressed, in the MMS, is 2000 k, then the user equipment directly obtains the image capacity information.

b) the user equipment determines the image capacity information that can be allocated to the compressed plurality of images based on the total information capacity of the message to be transmitted and information amount of other information therein.

For example, suppose the total information capacity of the MMS is 500 k, wherein the text information amount that has been input by the user is 256 k, then the user equipment determines that the image capacity information that can be allocated to the compressed plurality of images in the MMS=(500−256)k=244 k.

It should be noted that the above examples are only for better illustrating the technical solution of the present invention, rather than limiting the present invention. Those skilled in the art should understand that any implementation manner of obtaining image capacity information, which can be allocated to the compressed plurality of images, in the message to be transmitted, should fall within the scope of the present invention.

In the present step, the user equipment determines compression parameter information of a plurality of images to be compressed based on the maximum image reduction information and the image capacity information.

For example, the user equipment determines, in step S1, that the maximum image reduction information of a plurality of images A to D to be compressed is 106 k, and in step S6, that the image capacity information is 244 k, and further the image size information of the images A to D to be compressed is shown in Table 1, then based on a predetermined equation: compression parameter information=[image capacity information−(sum of image size information of a plurality of images to be compressed−maximum image reduction information)]/maximum image reduction information, the user equipment determines that the compression parameter information=[244−(270−106)]/106=75.472%.

For another example, the user equipment determines, in step S1, that the maximum image reduction information of the plurality of images A to D to be compressed is 108 k, and in step S6, that the image capacity information is 244 k, and further the predetermined compression lower-limit information includes the compression ratio lower-limit of the images A to D to be compressed being 60%, then based on a predetermined equation: compression parameter information=[image capacity information−maximum image reduction information*60%/(100−60%)]/maximum image reduction information, the user equipment determines that the compression parameter information=[244−108*1.5/108=75.926%.

It should be noted that given that in step S1, the user equipment adopts manner 1) to determine the maximum image reduction information of the compressed plurality of images, in the present step, the user equipment may also determine the compression parameter information based on the smallest image size information to which each image to be compressed can be compressed as obtained when performing step S1.

For example, the smallest image size information to which the images A to D to be compressed can be compressed, as obtained in step S1, is 60 k, 36 k, 48 k, and 20 k, respectively, the image capacity information determined in step S6 is 244 k, and the image size information of the images A to D to be compressed is shown in table 1; then the user equipment determines, based on a predetermined equation: compression parameter information=(image capacity information−the sum of smallest image size information to which respective images to be compressed can be compressed)/maximum image reduction information, determines that the compression parameter information=[244−(60+36+48+20)]/106=75.472%.

It should be noted that the above example is only for better illustrating the technical solution of the present invention, rather than limiting the present invention. Those skilled in the art should understand that any implementation manner of determining compression parameter information of a plurality of images to be compressed based on the maximum image reduction information and image capacity information should fall within the scope of the present invention.

Next, in step S3, the user equipment determines compression ratio information of each of the plurality of images to be compressed based on the compression parameter information, the image size information and maximum image reduction information after compression of each of the plurality of images to be compressed.

Here, the user equipment may determine the maximum image reduction information of each image to be compressed after compression during the process in step 1 of determining maximum image reduction information of the plurality of image to be compressed after compressed based on the image size information of each image to be compressed and the predetermined compression lower-limit information; or, the user equipment determines, in the present step, the maximum image reduction information of each image to be compressed after compression based on the image size information of each image to be compressed and predetermined compression lower-limit information, respectively.

Specifically, the user equipment may determine the compression ratio information of one image to be compressed through a plurality of manners.

For example, the compression parameter information determined by the user equipment in step S2 is 75.472%, the image size information of the plurality of images A to D to be compressed is shown in table 1, and the maximum image reduction information of the compressed plurality of images A to D as determined in step S1 is 40 k, 24 k, 32 k, and 10 k, respectively, then the user equipment, based on the predetermined equation: compression ratio information=(maximum image reduction information*compression parameter information+image size information−maximum image reduction information)/image size information, determines that the compression ratio information of the image A to be compressed=(40*75.472%+100−40)/100=90.189%; similarly, the user equipment determines that the compression ratio information of the images B to D to be compressed is 90.189%, 90.189%, and 91.824%, respectively.

It should be noted that the above examples are only for better illustrating the technical solution of the present invention, rather than limitation of the present invention. Those skilled in the art should understand, any implementation manner of determining compression ratio information of each of the plurality of images to be compressed based on the compression parameter information, the image size information and maximum image reduction information after compression of each of the plurality of images to be compressed, should fall within the scope of the present invention, for example, the user equipment also determines the maximum image reduction information of each image to be compressed after compression with further reference to the smallest image size information to which each image to be compressed can be compressed as determined during performing step S1; for another example, the proportion information as calculated in the above example is further rounded as the compression ratio information of a image to be compressed.

In step S4, the user equipment performs a compression operation on each of the plurality of images to be compressed based on the compression ratio information.

It should be noted that there is no absolute order between step S3 and step S4; for example, in step S3, each time when the user equipment determines compression ratio information of one image to be compressed, it would immediately perform step S4 of compressing the image to be compressed; next, the user equipment further determines the compression ratio information of another image to be compressed and then performs step S4; for another example, after the user equipment determines the compression ratio information of all images to be compressed in step S3, it then performs step S4 of compressing all images to be compressed.

Next, in step S5, the user equipment adds the compressed plurality of images into a message to be transmitted for transmission.

Preferably, the message to be transmitted includes, but not limited to, MMS, transmission information of a network printer including image(s) to be printed, etc.

It should be further noted that, when the compression parameter information obtained in step S2 is greater than 100%, it indicates that the image capacity information, which can be allocated to the compressed plurality of images, in the message to be transmitted, is large enough, and it is unnecessary to compress the image to be transmitted; then, in this case, it is unnecessary for the user equipment to perform steps S3 to S5, which, instead, directly adds the plurality of images to be compressed into the message to be transmitted for transmission.

By determining the compression ratio of an image with reference to the predetermined compression lower-limit information, the present invention ameliorates the issue of image quality degradation caused by over-compression of the image; besides, the present invention determines the image compression parameter through determining the image maximum reduction after compression of the image and then determines the image compression ratio, which can determine a better compression ratio while greatly simplifying the image compression ratio calculation.

As one of the preferred embodiments of the present invention, the present invention may further comprise steps S7, S8, S9, and S10 performed before step S1.

In step S7, when it is detected that the user performs an image insertion operation on the message to be transmitted, the user equipment performs the following steps S8 to S10 to each in one or more images selected by the user during the image insertion operation.

For example, if the message to be transmitted is MMS, the user selects images A', B', and C' during the image insert information performed to the MMS, and for each image in the images A', B', and C', the user equipment performs the following steps S8 to S10.

Hereinafter, steps S8 to S10 will be illustrated with respect to the operation performed by the user equipment to image A'.

In step S8, the user equipment determines whether the image resolution of the image exceeds a predetermined resolution upper-limit.

For example, the resolution of image A' is 1400*1200, the predetermined resolution upper-limit is 1600*1200, then the user equipment determines whether the image resolution of the image A' exceeds 1600*1200.

In step S9, when the image resolution of the image exceeds the predetermined resolution upper-limit, the user equipment pre-compresses the image into an image with an image resolution less than or equal to the predetermined resolution upper-limit, as one of the plurality of images to be compressed in step S1.

For example, based on the image resolution of image A' being 1400*1400, the user equipment determines that the image resolution of the image A' exceeds 1600*1200, then the user equipment pre-compresses the image A' into image A with an image resolution of 1400*1200, as one of the plurality of images to be compressed in step S1, e.g., as the image A to be compressed.

In step S10, when the image resolution of the image does not exceed the predetermined resolution upper-limit, the user equipment defines the image as one of the plurality of images to be compressed in step S1.

For example, if the image resolution of the image A' is 800*800 in the above example, then in step S8, the user equipment determines that the image resolution of the image A' does not exceed the predetermined resolution upper-limit 1600*1200, then in the present step, the user equipment directly defines image A' as one of the plurality of images to be compressed in step S1, e.g., image A to be compressed.

Similarly, the user equipment performs steps S8 to S10 to images B' and C', respectively.

It should be noted that the above examples are only for better illustrating the technical solution of the present invention, rather than limiting the present invention. Those skilled in the art should understand that any implementation manner of determining, for each image in one or more images selected by the user in the image insertion operation when detecting that the user performs an image insertion operation on the message to be transmitted, whether the image resolution of the image exceeds the predetermined resolution upper-limit, and when the image resolution of the image exceeds the predetermined resolution upper-limit, pre-compressing the image into an image with an image resolution less than or equal to the predetermined resolution upper-limit, as one of the plurality of images to be compressed in step S1; and when the image resolution of the image does not exceed the predetermined resolution upper-limit, defining the image as one of the plurality of images to be compressed in step S1, should fall within the protection scope of the present invention.

It should be further noted that the user may perform multiple times of image insertion operations, and user equipment performs steps S7 to S10 for each image insertion operation and then determine the plurality of images to be compressed in step S1 based on multiple times of image insertion operations. For example, after images A to C to be compressed have been determined based on the image insertion operations performed by the user, it is detected again in step S7 that the user performs a new image selection operation to select the image D', then the user equipment performs steps S8 to S10 to the image D', determining a image D to be compressed; next, the user performs a transmit operation, and the user equipment performs steps S1 to S5 to the images A to D to be compressed determined based on the twice image insertion operations performed by the user.

In the present embodiment, by performing a pre-compression processing on an image with too large resolution, the problem of unreasonable image compression caused by too large image difference is ameliorated, e.g., lowering the possibility of over compression of a image with small resolution due to existence of an image with too large resolution.

Figure 2:
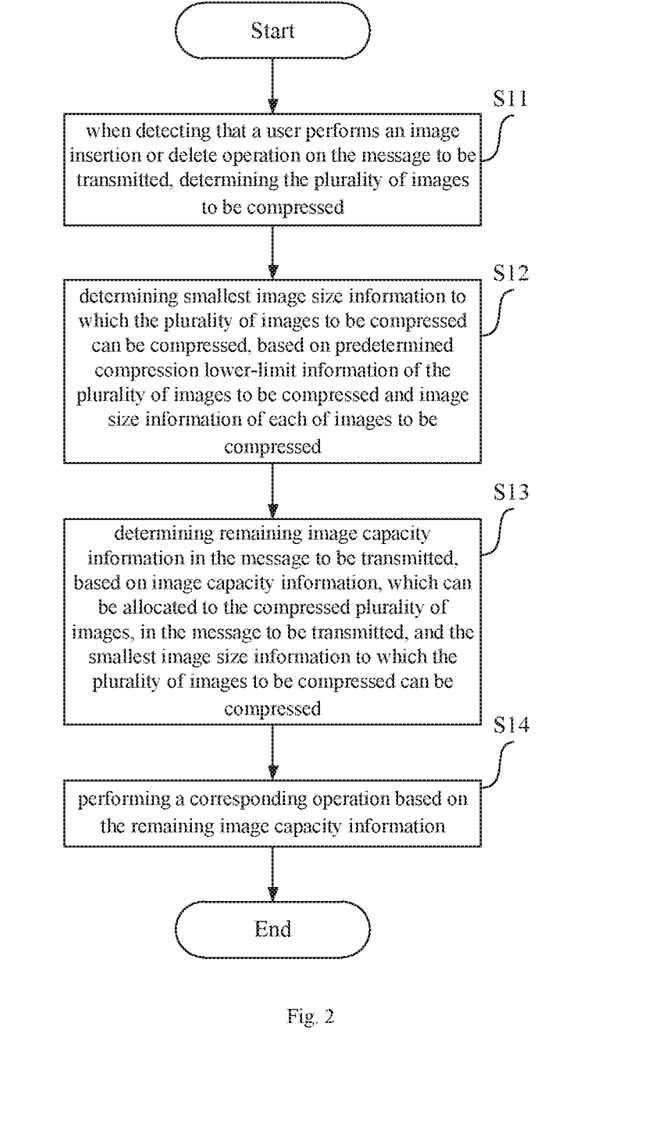
FIG. 2 shows a flow diagram of a method for determining remaining image capacity information according to one preferred embodiment of the present invention.

FIG. 2 shows a flow diagram of a method for determining remaining image capacity information according to one preferred embodiment of the present invention. The method of this embodiment comprises step S11, step S12, step S13, and step S14.

In step S11, when detecting that the user performs an image insertion or delete operation on a message to be transmitted, the user equipment determines a plurality of images to be compressed.

Specifically, the manner in which the user equipment determines a plurality of images to be compressed includes, but not limited to:

1) when the user equipment has not determined any image to be compressed, the user equipment determines an image selected by the user based on the image insertion operation performed by the user with respect to the message to be transmitted, and directly defines the image selected by the user as the image to be transmitted; or, by performing the previous steps S7 to S10, determines the image to be transmitted.

2) when the user equipment has determined the image to be transmitted based on the image insertion or delete operation previously performed by the user, the user equipment determines a plurality of images to be transmitted based on the image insertion or delete operations performed by the user at the current time and in conjunction with the previously already determined images to be transmitted.

For example, the user equipment determines images A, B, C, D to be transmitted, and E based on the image insertion operation previously performed by the user; when the user equipment detects that the user performs an image delete operation on the message to be transmitted and determines that the user selects to delete the image E to be transmitted, the user equipment deletes the image E to be transmitted from the images A, B, C, D to be transmitted, and E, and defines the remaining images A to D to be transmitted as the plurality of images to be transmitted.

For another example, the user equipment determines the images A, B, and C to be transmitted based on the image insertion operations previously performed by the user; when the user equipment detects that the user performs an image insertion operation on the message to be transmitted and determines that the user selects to insert image D', the user equipment performs the above steps S8 to S10, obtaining one image D to be transmitted, and defines the image D to be transmitted and the previously determined images A, B, and C to be transmitted as the plurality of images to be transmitted.

It should be noted that the above examples are only for better illustrating the technical solution of the present invention, rather than limiting the present invention. Those skilled in the art should understand that any implementation manner of determining a plurality of images to be compressed when detecting that the user performs an image insertion or delete operation on the message to be transmitted should fall within the scope of the present invention.

Next, in step S12, the user equipment determines smallest image size information to which the plurality of images to be compressed can be compressed, based on predetermined compression lower-limit information of the plurality of images to be compressed and image size information of each of images to be compressed.

For example, the predetermined compression lower-limit information includes: the image size lower-limit of the image to be compressed after compression is 20 k, the compression ratio lower-limit of the image to be compressed is 60%, and the image size information of the images A to D to be compressed is shown in Table 1; then, the user equipment determines, based on the image size information of the image A to be compressed 100 k*60%=60 k>20 k, that the smallest image size information that image A can be compressed to is 60 k; similarly, the user equipment determines that the smallest image size information to which the images B, C, and D can be compressed is 36 k, 48 k, and 20 k, respectively; then, the user equipment determines that the smallest image size information to which the plurality of images A to D to be compressed can be compressed=(60+36+48+20)k=164 k.

For another example, the image size information of a plurality of images A to D to be compressed is shown in Table 1, and the predetermined compression lower-limit information includes that the compression ratio lower-limit of the image to be compressed is 60%; then the user equipment determines that the smallest image size information to which the plurality of images A to D to be compressed can be compressed=(100+60+80+30)k*60%=162 k.

It should be noted that the above examples are only for better illustrating the technical solution of the present invention, rather than limiting the present invention. Those skilled in the art should understand that any implementation manner of determining the smallest image size information to which a plurality of images to be compressed can be compressed based on the predetermined compression lower-limit information and image size information of each image to be compressed should fall within the scope of the present invention.

Next, in step S13, the user equipment determines the remaining image capacity information in the message to be transmitted, based on the image capacity information, which can be allocated to the compressed plurality of images, in the message to be transmitted, and the smallest image size information to which the plurality of images to be compressed can be compressed.

For example, the image capacity information, which can be allocated to the compressed plurality of images, in the message to be transmitted is 244.5 k, and the smallest image size information determined in step S12 is 162 k, then the user equipment determines that the remaining image capacity information in the message to be transmitted=(244.5−162)k=82.5 k.

It should be noted that the above example is only for better illustrating the technical solution of the present invention, rather than limiting the present invention. Those skilled in the art should understand that any implementation manner of determining the remaining image capacity information in the message to be transmitted, based on the image capacity information, which can be allocated to the compressed plurality of images, in the message to be transmitted, and based on the smallest image size information to which the plurality of images to be compressed can be compressed, should fall within the scope of the present invention, e.g., defining value 82 after rounding the resulting 82.5 k in the above example as the remaining image capacity information.

Next, in step S14, the user equipment performs corresponding operation based on remaining image capacity information.

Preferably, the above corresponding operations include, but not limited to:

1) displaying the remaining image capacity information to the user;

2) displaying, to the user, the pre-estimated quantity information of the images which can be inserted into the message to be transmitted based on the remaining image capacity information.

For example, the image remaining capacity is 82.5 k, the predetermined compression lower-limit information includes the image size lower-limit information of the image to be compressed after compression being 20 k, then the user equipment pre-estimates that the quantity of image that can be further inserted in the message to be transmitted is 4 based on 82.5/20=4.125, and presents the quantity of image to the user.

Preferably, step S14 further comprises the following steps S141 and S142.

In step S141, when detecting that the user performs a new image insertion operation on the message to be transmitted, the user equipment determines whether the smallest image size information to which the one or more images can be compressed exceeds the remaining image capacity information based on image size information of one or more images selected by the user in the new image insertion operation and the predetermined compression lower-limit information.

For example, the image remaining capacity is 82.5 k, the predetermined compression lower-limit information includes the image size lower-limit information of the image to be compressed after compression being 20 k, and the quantity of image selected by the user during the new image insertion operation is 5, then the user equipment determines, based on 5*20 k>82.5 k, that the smallest image size information to which the image selected by the user during the new image insertion operation can be compressed is greater than the remaining image capacity information.

In step S142, when it is determined that the smallest image size information is greater than the remaining image capacity information, the user equipment indicates the user that the one or more images cannot be inserted.

In the present embodiment, the remaining image capacity information in the message to be transmitted can be pre-estimated, thereby indicating the user the capacity or quantity of image that can be further inserted;

besides, in the case of satisfying the predetermined compression lower-limit, when the image size of the images that can be further inserted by the user after compression is to exceed the remaining image capacity information, the user may be prevented for continuing further insertion of images, thereby guaranteeing the compression quality of the image.

Figure 3:
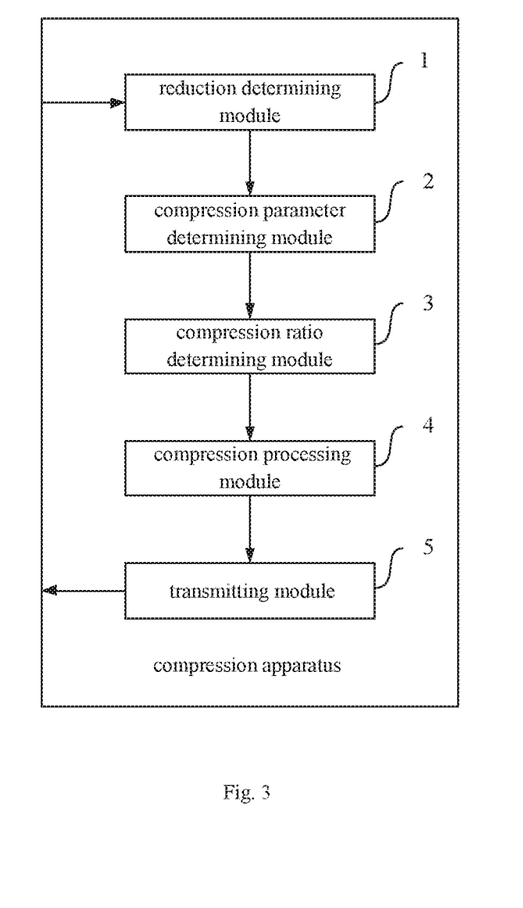
FIG. 3 shows a structural schematic diagram of a compressing apparatus for image compression according to one aspect of the present invention.

FIG. 3 shows a structural diagram of a compression apparatus for image compression according to one aspect of the present invention. The compression apparatus according to the present invention is included in the user equipment; the compression apparatus comprises a reduction determining module 1, a compression parameter determining module 2, a compression ratio determining module 3, a compression processing module 4, and a transmitting module 5.

The reduction determining module 1 determines maximum image reduction information after compression of a plurality of images to be compressed, based on predetermined compression lower-limit information of the images to be compressed and image size information of each of the images to be compressed.

Herein, the plurality of images to be compressed may be determined through a plurality of manners. For example, a smart phone determines, based on a user's image insertion operation performed to an MMS (multimedia message), a plurality of images that need to add into the MMS after compression, as the images to be compressed; for another example, when a user-preset image send time arrives, the instant messaging tool installed in the PC defines a plurality of images in a specified folder to images to be compressed that need to be compressed and then added into a message for transmission.

Herein, the predetermined compression lower-limit information includes any lower-limit that can be used to define the compression lower-limit of an image. Preferably, the predetermined compression lower-limit information includes, but not limited to, at least one of the following:

1) image size lower-limit information of a compressed image

For example, the image size lower-limit after compression of the image to be compressed is 20 k, etc.

2) compression ratio lower-limit information of the image to be compressed

For example, the compression ratio lower-limit of the image to be compressed is 60%, etc.

Specifically, the reduction determining module 1 can determine maximum image reduction information after compression of a plurality of images to be compressed, based on predetermined compression lower-limit information of the images to be compressed and image size information of each of the images to be compressed, through a plurality of manners. Preferably, the manner in which the reduction determining module 1 determines the maximum image reduction information after compression of a plurality of images to be compressed includes, but not limited to:

1) based on image size information of each image to be compressed and predetermined compression lower-limit information, the reduction determining module 1 determines the smallest image size information to which each image to be compressed can be compressed, thereby determining the maximum image reduction information of each image after compression, then sums the maximum image reduction information after compression of respective images to be compressed as the maximum image reduction information after compression of the plurality of images to be compressed.

For example, the determined a plurality of images to be compressed and their image size information are specified in Table 1 below:

TABLE 2

| Images to be compressed | Image size information |
| --- | --- |
| A | 100k |
| B | 60k |
| C | 80k |
| D | 30k |

The predetermined compression lower-limit information includes: the image size lower-limit after compression of the image to be compressed is 20 k and the compression ratio lower-limit of the image to be compressed is 60%; then, the reduction determining module 1 determines, based on the image size information of the image A to be compressed 100 k*60%=60 k>20 k, that the maximum image reduction information of the image A to be compressed is (100−60) k=40 k; similarly, the reduction determining module 1 determines that the maximum image reduction information after compression of images B, C, and D to be compressed is 24 k, 32 k, and 10 k, respectively; then, the reduction determining module 1 obtains the maximum image reduction information after compression of the plurality of images A to D to be compressed=(40+24+32+10)k=106 k.

2) based on the sum of image size information of the plurality of images to be compressed and predetermined compression lower-limit information, the reduction determining module 1 determines the maximum image reduction information after compression of a plurality of images to be compressed.

For example, image size information of a plurality of images A to D to be compressed is shown in Table 1; the predetermined compression lower-limit information includes that the compression ratio lower-limit of the images to be compressed is 60%; then the reduction determining module 1 determines that the maximum image reduction information after compression of the plurality of images A to D to be compressed=(100+60+80+30)k*40%=108 k.

It should be noted that the above examples are only for better understanding the technical solution of the present invention, rather than limiting the present invention. Those skilled in the art should understand, any implementation manner of determining the maximum image reduction information after compression of the plurality of images to be compressed based on predetermined compression lower-limit information of the plurality of images to be compressed and the image size information of each image to be compressed therein, should be included within the protection scope of the present invention, for example, in order to reduce calculation error and the impact on the final result due to inaccurate image size information, the calculated reduction information 106 k and 108 k was deducted by 5 k, as the finally determined maximum image reduction information after compression of the plurality of images A to D to be compressed.

Next, the compression parameter determining module 2 determines compression parameter information of the plurality of images to be compressed based on the maximum image reduction information.

Specifically, the manner in which the compression parameter determining module 2 determines the compression parameter information of a plurality of images to be compressed based on the maximum image reduction information includes, but not limited to:

1) the compression parameter determining module 2 directly determine the compression parameter information of a plurality of images to be compressed based on the maximum image reduction information.

For example, given that when the maximum image reduction information belongs to 0-100 k, its compression parameter information is 90%; when the maximum image reduction information is greater than 100 k but no greater than 200 k, its compression parameter information is 80%, and when the maximum image reduction information is greater than 200 k, its compression parameter information is 70%. In step S1, the maximum image reduction information of the plurality of images A to D to be compressed as determined by the user equipment is 116 k, then the user equipment determines that the compression parameter information of the plurality of compression images A to D is 80% based on 116 k being greater than 100 k but no greater than 200 k.

2) the compression apparatus further comprises a capacity obtaining module (not shown), and the compression parameter determining module 2 comprises a sub compression parameter determining module (not shown). The capacity obtaining module obtains image capacity information, which can be allocated to the compressed plurality of images, in the message to be transmitted; then the sub-compression parameter determining module determines the compression parameter information of the plurality of images to be compressed based on the maximum image reduction information and image capacity information, wherein the plurality of images to be compressed need to be compressed before being added into the message to be transmitted for transmission.

Herein, the manner in which the capacity obtaining module obtains the image capacity information includes, but not limited to:

a) the capacity obtaining module directly obtains image capacity information, which is pre-allocated to the compressed plurality of images, in the message to be transmitted.

For example, suppose the image capacity information, which is pre-allocated to the compressed plurality of images, in the MMS, is 2000 k, then the capacity obtaining module directly obtains the image capacity information.

b) the capacity obtaining module determines the image capacity information that can be allocated to the compressed plurality of images based on the total information capacity of the message to be transmitted and information amount of other information therein.

For example, suppose the total information capacity of the MMS is 500 k, wherein the text information amount that has been input by the user is 256 k, then the capacity obtaining module determines that the image capacity information that can be allocated to the compressed plurality of images in the MMS=(500−256)k=244 k.

It should be noted that the above examples are only for better illustrating the technical solution of the present invention, rather than limiting the present invention. Those skilled in the art should understand that any implementation manner of obtaining image capacity information, which can be allocated to the compressed plurality of images, in the message to be transmitted, should fall within the scope of the present invention.

The sub-compression parameter determining module determines compression parameter information of a plurality of images to be compressed based on the maximum image reduction information and the image capacity information.

For example, the reduction determining module 1 determines that the maximum image reduction information of a plurality of images A to D to be compressed is 106 k, and the capacity obtaining module determines that the image capacity information is 244 k, and further the image size information of the images A to D to be compressed is shown in Table 1, then based on a predetermined equation: compression parameter information=[image capacity information−(sum of image size information of a plurality of images to be compressed−maximum image reduction information)]/maximum image reduction information, the sub compression parameter determining module determines that the compression parameter information=[244−(270−106)]/106=75.472%.

For another example, the reduction determining module 1 determines that the maximum image reduction information of a plurality of images A to D to be compressed is 108 k, and the capacity obtaining module determines that the image capacity information is 244 k, and further the predetermined compression lower-limit information includes the compression ratio lower-limit of the images A to D to be compressed being 60%, then based on a predetermined equation: compression parameter information=[image capacity information−maximum image reduction information*60%/(100−60%)]/maximum image reduction information, the sub compression parameter determining module determines that the compression parameter information=[244−108*1.5/108=75.926%.

It should be noted that given that when the reduction determining module 1 adopts manner 1) to determine the maximum image reduction information of the compressed plurality of images to be processed, the sub compression parameter determining module may also determine the compression parameter information based on the smallest image size information to which each image to be compressed can be compressed as obtained when executing the reduction determining module 1.

For example, the smallest image size information to which the images A to D to be compressed can be compressed, as obtained by the reduction determining module 1, is 60 k, 36 k, 48 k, and 20 k, respectively, the image capacity information determined by the capacity obtaining module is 244 k, and the image size information of the images A to D to be compressed is shown in table 1; then the sub compression parameter determining module determines, based on a predetermined equation: compression parameter information=(image capacity information−the sum of smallest image size information to which respective images to be compressed can be compressed)/maximum image reduction information, determines that the compression parameter information=[244−(60+36+48+20)]/106=75 0.472%.

It should be noted that the above example is only for better illustrating the technical solution of the present invention, rather than limiting the present invention. Those skilled in the art should understand that any implementation manner of determining compression parameter information of a plurality of images to be compressed based on the maximum image reduction information and image capacity information should fall within the scope of the present invention.

Next, the compression ratio determining module 3 determines compression ratio information of each of the plurality of images to be compressed based on the compression parameter information, the image size information and maximum image reduction information after compression of each of the plurality of images to be compressed.

Here, the maximum image reduction information of each image to be compressed after compression can be determined by the reduction determining module 1 during the process of determining maximum image reduction information of the plurality of image to be compressed after compressed based on the image size information of each image to be compressed and the predetermined compression lower-limit information; or, determined, by the compression ratio determining module 3, based on the image size information of each image to be compressed and predetermined compression lower-limit information, respectively.

Specifically, the compression ratio determining module 2 may determine the compression ratio information of one image to be compressed through a plurality of manners.

For example, the compression parameter information determined by the compression ratio determining module 2 is 75.472%, the image size information of the plurality of images A to D to be compressed is shown in table 1, and the maximum image reduction information of the compressed plurality of images A to D as determined by the reduction determining module 1 is 40 k, 24 k, 32 k, and 10 k, respectively, then the compression ratio determining module 3, based on the predetermined equation: compression ratio information=(maximum image reduction information*compression parameter information+image size information−maximum image reduction information)/image size information, determines that the compression ratio information of the image A to be compressed=(40*75.472%+100−40)/100=90.189%; similarly, the compression ratio determining module 3 determines that the compression ratio information of the images B to D to be compressed is 90.189%, 90.189%, and 91.824%, respectively.

It should be noted that the above examples are only for better illustrating the technical solution of the present invention, rather than limitation of the present invention. Those skilled in the art should understand, any implementation manner of determining compression ratio information of each of the plurality of images to be compressed based on the compression parameter information, the image size information and maximum image reduction information after compression of each of the plurality of images to be compressed, should fall within the scope of the present invention, for example, the compression ratio determining module 3 also determines the maximum image reduction information of each image to be compressed after compression with further reference to the smallest image size information to which each image to be compressed can be compressed as determined during the reduction determining module 1 performs the operation; for another example, the proportion information as calculated in the above example is further rounded as the compression ratio information of a image to be compressed.

The compression processing module 4 performs a compression operation on each image to be compressed based on the compression ratio information.

It should be noted that there is no absolute order between the operations performed by the compression determining module 3 and the compression processing module 4; for example, each time when the compression ratio determining module 3 determines compression ratio information of one image to be compressed, the compression processing module 4 would immediately perform operation of compressing the image to be compressed; next, the compression ratio determining module 3 further determines the compression ratio information of another image to be compressed and the compression processing module 4 then performs operation; for another example, after the compression ratio determining module 3 determines the compression ratio information of all images to be compressed, the compression processing module 4 then performs operation of compressing all images to be compressed.

Next, the transmitting module 5 adds the compressed plurality of images into a message to be transmitted for transmission.

Preferably, the message to be transmitted includes, but not limited to, MMS, transmission information of a network printer including image(s) to be printed, etc.

It should be further noted that, when the compression parameter information obtained by the compression parameter determining module 2 is greater than 100%, it indicates that the image capacity information, which can be allocated to the compressed plurality of images, in the message to be transmitted, is large enough, and it is unnecessary to compress the image to be transmitted; then, in this case, it is unnecessary for the compression ratio determining module 3, the compression processing module 4, and the transmitting module 5 to perform operations, and instead, the user equipment directly adds the plurality of images to be compressed into the message to be transmitted for transmission.

By determining the compression ratio of an image with reference to the predetermined compression lower-limit information, the present invention ameliorates the issue of image quality degradation caused by over-compression of the image; besides, the present invention determines the image compression parameter through determining the image maximum reduction after compression of the image and then determines the image compression ratio, which can determine a better compression ratio while greatly simplifying the image compression ratio calculation.

As one of the preferred embodiments of the present invention, the present invention may further comprise a triggering module (not shown), a first determining module (not shown), a pre-compression module (not shown), and a defining module (not shown).

When it is detected that the user performs an image insertion operation on the message to be transmitted, the trigger module trigger the first determining module, the pre-compression module and the defining module to perform operations on each in one or more images selected by the user during the image insertion operation.

For example, if the message to be transmitted is MMS, the user selects images A', B', and C' during the image insert information performed to the MMS, and for each image in the images A', B', and C', the trigger module triggers the first determining module, the pre-compression module and the defining module performs the following operations.

Hereinafter, the first determining module, the pre-compression module and the defining module will be illustrated with respect to the operation performed to image A'.

The first determining module determines whether the image size of the image exceeds the predetermined size upper-limit.

For example, the resolution of image A' is 1400*1200, the predetermined resolution upper-limit is 1600*1200, then the first determining module determines whether the image size of the image A' exceeds 1600*1200.

When the image resolution of the image exceeds the predetermined resolution upper-limit, the pre-compression module pre-compresses the image into an image with an image resolution less than or equal to the predetermined resolution upper-limit, as one of the images to be compressed processed by the reduction determining module 1.

For example, based on the image resolution of image A' being 1400*1400, the first determining module determines that the image resolution of the image A' exceeds 1600*1200, then the pre-compression module pre-compresses the image A' into image A with an image resolution of 1400*1200, as one of a plurality of images to be compressed processed by the reduction determining module 1, e.g., as the image A to be compressed.

When the image resolution of the image does not exceed the predetermined resolution upper-limit, the defining module defines the image as one of the plurality of images to be compressed processed by the reduction determining module 1.

For example, if the image resolution of the image A' is 800*800 in the above example, then the first determining module determines that the image resolution of the image A' does not exceed the predetermined resolution upper-limit 1600*1200, then the defining module directly defines image A' as one of the plurality of images to be compressed processed by the reduction determining module 1, e.g., image A to be compressed.

Similarly, the first determining module, the pre-compression module and the defining module perform the above operations on images B' and C', respectively.

It should be noted that the above examples are only for better illustrating the technical solution of the present invention, rather than limiting the present invention. Those skilled in the art should understand that any implementation manner of determining, for each image in one or more images selected by the user in the image insertion operation when detecting that the user performs an image insertion operation on the message to be transmitted, whether the image resolution of the image exceeds the predetermined resolution upper-limit, and when the image resolution of the image exceeds the predetermined resolution upper-limit, pre-compressing the image into an image with an image resolution less than or equal to the predetermined resolution upper-limit, as one of the plurality of images to be compressed processed by the reduction determining module 1; and when the image resolution of the image does not exceed the predetermined resolution upper-limit, defining the image as one of the plurality of images to be compressed processed by the reduction determining module 1, should fall within the scope of the present invention.

It should be further noted that the user may perform multiple times of image insertion operations, and the trigger module triggers the first determining module, the pre-compression module and the defining module for each image insertion operation and then determines the plurality of images to be compressed processed by the reduction determining module 1 based on multiple times of image insertion operations. For example, after images A to C to be compressed have been determined based on the image insertion operations performed by the user, the trigger module detects that the user performs a new image selection operation to select the image D', then the trigger module triggers the first determining module, the pre-compression module and the defining module to perform operations on the image D', determining a image D to be compressed; next, the user performs a transmit operation, and the reduction determining module 1, the compression parameter determining module 2, the compression ratio determining module 3, the compression processing module 4, and the defining module 5, to the images A to D to be compressed determined based on the twice image insertion operations performed by the user.

In the present embodiment, by performing a pre-compression processing on an image with too large resolution, the problem of unreasonable image compression caused by too large image difference is ameliorated, e.g., lowering the possibility of over compression of a image with small resolution due to existence of an image with too large resolution.

Figure 4:
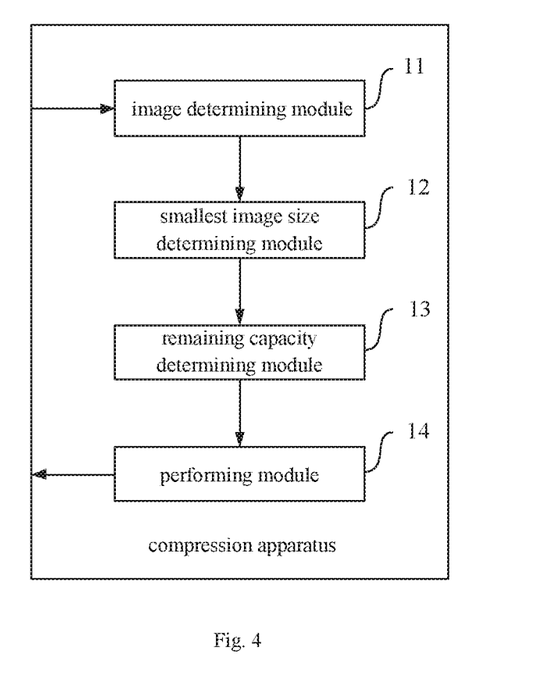
FIG. 4 shows a structural schematic diagram of a compressing apparatus for determining remaining image capacity information according to one preferred embodiment of the present invention.

FIG. 4 shows a structural block diagram of a compression apparatus for determining remaining image capacity information according to one preferred embodiment of the present invention. The compression module of this embodiment comprises an image determining module 11, a smallest image size determining module 12, a remaining capacity determining module 13, and an performing module 14.

When detecting that the user performs an image insertion or delete operation on a message to be transmitted, the image determining module 11 determines a plurality of images to be compressed.

Specifically, the manner in which the image determining module 11 determines a plurality of images to be compressed includes, but not limited to:

1) when no image to be compressed is determined, the image determining module 11 determines an image selected by the user based on the image insertion operation performed by the user with respect to the message to be transmitted, and directly defines the image selected by the user as an image to be transmitted;

or, the image determining module 11 determines the image to be transmitted through operations performed by the trigger module, the first determining module, the pre-compression module and the defining module comprised therein.

2) when the image to be transmitted has been determined based on the image insertion or delete operation previously performed by the user, the image determining module 11 determines a plurality of images to be transmitted based on the image insertion or delete operations performed by the user at the current time and in conjunction with the previously already determined images to be transmitted.

For example, the image determining module 11 determines images A, B, C, D, and E to be transmitted based on the image insertion operation previously performed by the user; when the image determining module detects that the user performs an image delete operation on the message to be transmitted and determines that the user selects to delete the image E to be transmitted, the image determining module 11 deletes the image E to be transmitted from the images A, B, C, D, and E to be transmitted, and defines the remaining images A to D to be transmitted as a plurality of images to be transmitted.

For another example, the image determining module 11 determines the images A, B, and C to be transmitted based on the image insertion operations previously performed by the user; the image determining module 11 comprises the trigger module, the first determining module, the pre-compression module and the defining module; when the trigger module detects that the user performs an image insertion operation on the message to be transmitted and determines that the user selects to insert image D', the first determining module, the pre-compression module, and the defining module performs operations to determine one image D to be transmitted, and defines the image D to be transmitted and the previously determined images A, B, and C to be transmitted as a plurality of images to be transmitted.

It should be noted that the above examples are only for better illustrating the technical solution of the present invention, rather than limiting the present invention. Those skilled in the art should understand that any implementation manner of determining a plurality of images to be compressed when detecting that the user performs an image insertion or delete operation on the message to be transmitted should fall within the scope of the present invention.

Next, the smallest image size determining module 12 determines smallest image size information to which the plurality of images to be compressed can be compressed, based on predetermined compression lower-limit information of the plurality of images to be compressed and image size information of each of image to be compressed.

For example, the predetermined compression lower-limit information includes: the image size lower-limit of the image to be compressed after compression is 20 k, the compression ratio lower-limit of the image to be compressed is 60%, and the image size information of the images A to D to be compressed is shown in Table 2; then, the smallest image size determining module 12 determines, based on the image size information of the image A to be compressed 100 k*60%=60 k>20 k, that the smallest image size information that image A can be compressed to is 60 k; similarly, the smallest image size determining module 12 determines that the smallest image size information to which the images B, C, and D can be compressed is 36 k, 48 k, and 20 k, respectively; then, the smallest image size determining module 12 determines that the smallest image size information to which the plurality of images A to D to be compressed can be compressed=(60+36+48+20)k=164 k.

For another example, the image size information of a plurality of images A to D to be compressed is shown in Table 2, and the predetermined compression lower-limit information includes that the compression ratio lower-limit of the image to be compressed is 60%; then the smallest image size determining module 12 determines that the smallest image size information to which the plurality of images A to D to be compressed can be compressed=(100+60+80+30)k*60%=162 k.

It should be noted that the above examples are only for better illustrating the technical solution of the present invention, rather than limiting the present invention. Those skilled in the art should understand that any implementation manner of determining the smallest image size information to which a plurality of images to be compressed can be compressed based on the predetermined compression lower-limit information and image size information of each image to be compressed should fall within the scope of the present invention.

Next, the remaining capacity determining module 13 determines the remaining image capacity information in the message to be transmitted based on the image capacity information, which can be allocated to the compressed plurality of images, in the message to be transmitted, and the smallest image size information to which the plurality of images to be compressed can be compressed.

For example, the image capacity information, which can be allocated to the compressed plurality of images, in the message to be transmitted is 244.5 k, and the smallest image size information determined by the smallest image size determining module 12 is 162 k, then the remaining capacity determining module 13 determines that the remaining image capacity information in the message to be transmitted=(244.5−162)k=82.5 k.

It should be noted that the above example is only for better illustrating the technical solution of the present invention, rather than limiting the present invention. Those skilled in the art should understand that any implementation manner of determining the remaining image capacity information in the message to be transmitted based on the image capacity information, which can be allocated to the compressed plurality of images, in the message to be transmitted, and based on the smallest image size information to which the plurality of images to be compressed can be compressed, should fall within the scope of the present invention, e.g., defining value 82 after rounding the resulting 82.5 k in the above example as the remaining image capacity information.

Next, the performing module 14 performs corresponding operation based on remaining image capacity information.

Preferably, the above corresponding operations include, but not limited to:

1) displaying the remaining image capacity information to the user;

2) displaying, to the user, the pre-estimated quantity information of the images which can be inserted into the message to be transmitted based on the remaining image capacity information.

For example, the image remaining capacity is 82.5 k, the predetermined compression lower-limit information includes the image size lower-limit information of the image to be compressed after compression being 20 k, then the user equipment pre-estimates that the quantity of image that can be further inserted in the message to be transmitted is 4 based on 82.5/20=4.125, and presents the quantity of image to the user.

Preferably, the performing module 14 further comprises a second determining module (not shown) and a indicate module (not shown).

When detecting that the user performs a new image insertion operation on the message to be transmitted, the second determining module determines whether the smallest image size information to which the one or more images can be compressed exceeds the remaining image capacity information based on image size information of one or more images selected by the user in the new image insertion operation and the predetermined compression lower-limit information.

For example, the image remaining capacity is 82.5 k, the predetermined compression lower-limit information includes the image size lower-limit information of the image to be compressed after compression being 20 k, and the quantity of image selected by the user during the new image insertion operation is 5, then the second determining module determines, based on 5*20 k>82.5 k, that the smallest image size information to which the image selected by the user during the new image insertion operation can be compressed is greater than the remaining image capacity information can be compressed.

When it is determined that the smallest image size information is greater than the remaining image capacity information, the indicate module indicates the user that the one or more images cannot be inserted.

In the present embodiment, the remaining image capacity information in the message to be transmitted can be pre-estimated, thereby indicating the user the capacity or quantity of image that can be further inserted; besides, in the case of satisfying the predetermined compression lower-limit, when the image size of the images that can be further inserted by the user after compression is to exceed the remaining image capacity information, the user may be prevented for continuing further insertion of images, thereby guaranteeing the compression quality of the image.

It should be noted that the present invention may be implemented in software and/or a combination of software and hardware. For example, the present invention may be implemented by an application-specific integrated circuit (ASIC), a general-purpose computer, or any other similar hardware device.

The software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, a circuit cooperating with the processor so as to implement various steps of functions.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method for image compression in a user equipment, wherein the method comprises the following steps:

a. determining maximum image reduction information after compression of a plurality of images to be compressed, based on predetermined compression lower-limit information of the images to be compressed and image size information of each of the images to be compressed;

b. obtaining image capacity information, which can be allocated to the compressed plurality of images in the message to be transmitted;

c. determining compression parameter information of the plurality of images to be compressed based on the maximum image reduction information;

d. determining compression ratio information of each of the plurality of images to be compressed based on the compression parameter information, the image size information and maximum image reduction information after compression of each of the plurality of images to be compressed;

e. compressing each of the plurality of images to be compressed based on the compression ratio information; and f. adding the compressed images into a message to be transmitted for transmission, wherein step c comprises determining the compression parameter information of the plurality of images to be compressed based on the image capacity information and the maximum image reduction information of the plurality of images to be compressed.

2. The method according to claim 1, wherein the method further comprises the following steps before the step a:

when detecting that a user performs an image insertion operation on the message to be transmitted, performing the following operations on each of one or more images selected by the user in the image insertion operation:

determining whether the image resolution of the image exceeds a predetermined resolution upper-limit;

when the image resolution of the image exceeds the predetermined resolution upper-limit, pre-compressing it into an image which is smaller than or equal to the predetermined resolution upper-limit, as one of the plurality of images to be compressed;

when the image resolution of the image does not exceed the predetermined resolution upper-limit, taking it as one of the plurality of images to be compressed.

3. The method according to claim 1, wherein the method further comprises the following steps:
w. when detecting that a user performs an image insertion or delete operation on the message to be transmitted, determining the plurality of images to be compressed;
x. determining smallest image size information to which the plurality of images to be compressed can be compressed, based on predetermined compression lower-limit information of the plurality of images to be compressed and image size information of each of images to be compressed;
y. determining remaining image capacity information in the message to be transmitted, based on image capacity information, which can be allocated to the compressed plurality of images, in the message to be transmitted, and the smallest image size information to which the plurality of images to be compressed can be compressed;
z. performing a corresponding operation based on the remaining image capacity information.

4. The method according to claim 3, wherein the step z comprises the following steps:
when detecting that a user performs a new image insertion operation on the message to be transmitted, based on image size information of one or more images selected during the new image insertion operation and the predetermined compression lower-limit information, determining whether the smallest image size information to which the one or more images can be compressed is larger than the remaining image capacity information;
when determining that the smallest image size information is larger than the remaining image capacity information, indicating the user that the one or more images cannot be inserted.

5. The method according to claim 3, wherein the corresponding operation comprises at least one of the following:
displaying the remaining image capacity information to the user;
displaying, to the user, the pre-estimated quantity information of the image which can be inserted into the message to be transmitted based on the remaining image capacity information.

6. The method according to claim 1, wherein the predetermined compression lower-limit information includes at least one of the following:
image size lower-limit information of the compressed image;
compression ratio lower-limit information of the image to be compressed.

7. The method according to claim 1, wherein the message to be transmitted comprises a multimedia message, transmission information of a network printer including image(s) to be printed.

8. A compressing apparatus for image compression in a user equipment, wherein the compressing apparatus comprises:
a reduction determining module configured to determine maximum image reduction information after compression of a plurality of images to be compressed, based on predetermined compression lower-limit information of the images to be compressed and image size information of each of the images to be compressed;
a compression parameter determining module configured to compression parameter information of the plurality of images to be compressed based on the maximum image reduction information;
a compression ratio determining module configured to compression ratio information of each of the plurality of images to be compressed based on the compression parameter information, the image size information and maximum image reduction information after compression of each of the plurality of images to be compressed;
a compression processing module configured to compress each of the plurality of images to be compressed based on the compression ratio information; and
a transmitting module configured to add the compressed images into a message to be transmitted for transmission,
wherein the compressing apparatus further comprises a capacity obtaining module configured to obtain image capacity information, which can be allocated to the compressed plurality of images in the message to be transmitted; and
wherein the compression parameter determining module comprises a sub compression parameter determining module configured to determine the compression parameter information of the plurality of images to be compressed based on the image capacity information and the maximum image reduction information of the plurality of images to be compressed.

9. The compressing apparatus according to claim 8, wherein the compressing apparatus further comprises:
a triggering module configured to, when detecting that a user performs an image insertion operation on the message to be transmitted, trigger the following modules to perform operations on each of one or more images selected by the user in the image insertion operation:
a first determining module configured to determine whether the image resolution of the image exceeds a predetermined resolution upper-limit;
a pre-compressing module configured to, when the image resolution of the image exceeds the predetermined resolution upper-limit, pre-compress it into an image which is smaller than or equal to the predetermined resolution upper-limit, as one of the plurality of images to be compressed;
a defining module configured to, when the image resolution of the image does not exceed the predetermined resolution upper-limit, take it as one of the plurality of images to be compressed.

10. The compressing apparatus according to claim 8, wherein the compressing apparatus further comprises:
an image determining module configured to, when detecting that a user performs an image insertion or delete operation on the message to be transmitted, determine the plurality of images to be compressed;
a smallest image size determining module configured to determine smallest image size information to which the plurality of images to be compressed can be compressed, based on predetermined compression lower-limit information of the plurality of images to be compressed and image size information of each of images to be compressed;
a remaining capacity determining module configured to determine remaining image capacity information in the message to be transmitted, based on image capacity information, which can be allocated to the compressed plurality of images, in the message to be transmitted, and the smallest image size information to which the plurality of images to be compressed can be compressed;

a performing module configured to perform a corresponding operation based on the remaining image capacity information.

11. The compressing apparatus according to claim 10, wherein the performing module comprises:

a second determining module configured to, when detecting that a user performs a new image insertion operation on the message to be transmitted, based on image size information of one or more images selected during the new image insertion operation and the predetermined compression lower-limit information, determine whether the smallest image size information to which the one or more images can be compressed is larger than the remaining image capacity information;

a indicating module configured to, when determining that the smallest image size information is larger than the remaining image capacity information, indicate the user that the one or more images cannot be inserted.

12. The compressing apparatus according to claim 10, wherein the corresponding operation comprises at least one of the following:

displaying the remaining image capacity information to the user;

displaying, to the user, the pre-estimated quantity information of the image which can be inserted into the message to be transmitted based on the remaining image capacity information.

13. The compressing apparatus according to claim 8, wherein the predetermined compression lower-limit information includes at least one of the following:

image size lower-limit information of the compressed to be compressed;

compression ratio lower-limit information of the image to be compressed.

14. The compressing apparatus according to claim 8, wherein the message to be transmitted comprises a multimedia message, transmission information of a network printer including image(s) to be printed.

15. A user equipment, comprising the compressing apparatus according to claim 8.

16. A non-transitory computer-readable storage medium containing instructions, that when executed, control a computer system to be configured for:

determining maximum image reduction information after compression of a plurality of images to be compressed, based on predetermined compression lower-limit information of the images to be compressed and image size information of each of the images to be compressed;

obtaining image capacity information, which can be allocated to the compressed plurality of images in the message to be transmitted;

determining compression parameter information of the plurality of images to be compressed based on the maximum image reduction information;

determining compression ratio information of each of the plurality of images to be compressed based on the compression parameter information, the image size information and maximum image reduction information after compression of each of the plurality of images to be compressed;

compressing each of the plurality of images to be compressed based on the compression ratio information; and adding the compressed images into a message to be transmitted for transmission, wherein determining compression parameter information of the plurality of images to be compressed based on the maximum image capacity information comprises determining the compression parameter information of the plurality of images to be compressed based on the image capacity information and the maximum image reduction information of the plurality of images to be compressed.

* * * * *